US012592974B2

(12) United States Patent
Ma et al.

(10) Patent No.: US 12,592,974 B2
(45) Date of Patent: Mar. 31, 2026

(54) ROUTING-POLICY-BASED GLOBAL USER COMPLIANCE ACCESS METHOD AND APPARATUS

(71) Applicant: Hangzhou PingPong Intelligence Technology Co., Ltd., Zhejiang (CN)

(72) Inventors: Hongwei Ma, Zhejiang (CN); Peng Chen, Zhejiang (CN); Junying Zhu, Zhejiang (CN); Yu Chen, Zhejiang (CN); Ning Wang, Zhejiang (CN); Shuai Lu, Zhejiang (CN)

(73) Assignee: Hangzhou PingPong Intelligence Technology Co., Ltd., Zhejiang (CN)

( * ) Notice: Subject to any disclaimer, the term of this patent is extended or adjusted under 35 U.S.C. 154(b) by 0 days.

(21) Appl. No.: 18/835,737

(22) PCT Filed: Sep. 5, 2023

(86) PCT No.: PCT/CN2023/116976
§ 371 (c)(1),
(2) Date: Aug. 5, 2024

(87) PCT Pub. No.: WO2024/152572
PCT Pub. Date: Jul. 25, 2024

(65) Prior Publication Data
US 2025/0141930 A1      May 1, 2025

(30) Foreign Application Priority Data
Jan. 17, 2023    (CN) .......................... 202310058522.6

(51) Int. Cl.
| | |
|---|---|
| *G06F 21/00* | (2013.01) |
| *H04L 9/40* | (2022.01) |
| *H04L 29/06* | (2006.01) |

(52) U.S. Cl.
CPC .......... *H04L 63/20* (2013.01); *H04L 63/0435* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 2014/0129457 A1* | 5/2014 | Peeler .................. | G06Q 30/018 |
| | | | 705/317 |
| 2018/0288060 A1 | 10/2018 | Jackson et al. | |

FOREIGN PATENT DOCUMENTS

| | | |
|---|---|---|
| CN | 110753062 | 2/2020 |
| CN | 110990868 | 4/2020 |
| (Continued) | | |

OTHER PUBLICATIONS

"International Search Report (Form PCT/ISA/210) of PCT/CN2023/116976", mailed on Nov. 17, 2023, pp. 1-3.

(Continued)

*Primary Examiner* — Lisa C Lewis
(74) *Attorney, Agent, or Firm* — JC ONE WORLD

(57) ABSTRACT

A routing-policy-based global user compliance access method and an apparatus are provided. The method includes steps of: initiating, by a user, a login request to a unified user gateway if there is a user login behavior; sending, by an authentication unit, an authenticated user request to a local user center for processing, and to the global user center for global query if the user is a non-local user; initiating, by the user, a business request to the unified user gateway if there is a user business operation behavior; routing the request to an application program interface after being passed by the authentication unit; sending, by the application program interface, the business request to the local user center for business processing, and to a global business center for (Continued)

routing policy query and redirecting to the remote user center to which the user belongs if the user is the non-local user.

4 Claims, 7 Drawing Sheets

(56) References Cited

FOREIGN PATENT DOCUMENTS

| CN | 113971594 | | 1/2022 |
|----|-----------|---|--------|
| CN | 116055198 | | 5/2023 |
| CN | 120337188 | * | 7/2025 |

OTHER PUBLICATIONS

"Written Opinion of the International Searching Authority (Form PCT/ISA/237) of PCT/CN2023/116976", mailed on Nov. 17, 2023, pp. 1-4.
Sabrina De Capitani Di Vimercati et al., "Access Control in Federated Systems", 1996 New Security Paradigms Workshop, Sep. 17-20, 1996, pp. 87-99.
Syed Rizvi et al., "A Semi-Distributed Access Control Management Scheme for Securing Cloud Environment", 2015 IEEE 8th International Conference on Cloud Computing, Jun. 27-Jul. 2, 2015, pp. 501-507.
"Search Report of Europe Counterpart Application", issued on Apr. 7, 2025, p. 1-p. 9.

* cited by examiner a user initiates a login request to a unified user gateway if there is a user login behavior; the unified user gateway routes the login request to an authentication unit; the authentication unit sends an authenticated user request to a local user center for processing and to the global user center for global query if the user is a non-local user; failure results are directly returned if the global query fails, and otherwise a routing information to which the user belongs is returned according to the global routing policy and redirected to a remote user center to which the user belongs for request processing

S10 the user initiates a business request to the unified user gateway if there is a user business operation behavior; the unified user gateway routes the business request to the authentication unit; the request is routed to an application program interface after being passed by the authentication unit; the application program interface sends the business request to the local user center for business processing, and to a global business center for routing policy query and redirects to the remote user center to which the user belongs for request processing if the user is the non-local user

ROUTING-POLICY-BASED GLOBAL USER COMPLIANCE ACCESS METHOD AND APPARATUS

CROSS-REFERENCE TO RELATED APPLICATION

This application is a 371 of international application of PCT application serial no. PCT/CN2023/116976, filed on Sep. 5, 2023, which claims the priority benefit of China application no. 202310058522.6, filed on Jan. 17, 2023. The entirety of each of the above mentioned patent applications is hereby incorporated by reference herein and made a part of this specification.

FIELD OF THE INVENTION

The invention belongs to the field of computer technology, in particular, to a routing-policy-based global user compliance access method and an apparatus.

DESCRIPTION OF THE RELATED ART

As globalized cross-border e-commerce and cross-border payment become more and more frequent, conventional centralized user centers are no longer suitable for the application of geo-legal laws and geo-regulations. In the process of globalization strategy deployment, more and more countries and regions will be involved, and the corresponding compliance requirements will also increase. A common solution is to provide better access to the nearest location and reduce access links based on the geographical location of the user, mainly using performance and access efficiency as the main technical indicators; there will be no special requirements for the storage and access of some sensitive and private information, but differences in supervision and operations will need to be reduced for the cross-border payment industry. Compliance with data storage policies and access policies in different countries and regions is particularly important.

SUMMARY OF THE INVENTION

In view of the above problems, the invention provides a routing-policy-based global user compliance access method, apparatus and an electronic device. The invention is used to synchronize and route user data through the global user center to ensure realization of unified login and authorization for any site around the world in case that local user data is compliant.

In order to solve the said technical problem, the invention uses the following technical solutions:

In a first aspect, the invention provides a routing-policy-based global user compliance access method, which includes steps of:

initiating, by a user, a login request to a unified user gateway if there is a user login behavior; routing, by the unified user gateway, the login request to an authentication unit; sending, by the authentication unit, an authenticated user request to a local user center for processing and to the global user center for global query if the user is a non-local user; directly returning failure results if the global query fails, and otherwise returning a routing information to which the user belongs according to the global routing policy and redirecting to a remote user center to which the user belongs for request processing;

initiating, by the user, a business request to the unified user gateway if there is a user business operation behavior; routing, by the unified user gateway, the business request to the authentication unit; routing the request to an application program interface after being passed by the authentication unit; sending, by the application program interface, the business request to the local user center for business processing, and to a global business center for routing policy query and redirecting to the remote user center to which the user belongs for request processing if the user is the non-local user.

In a possible embodiment, the global query performs retrieval based on a global routing policy.

In a possible embodiment, the business operation includes at least one of global data duplication judgment, basic information modification and basic information query.

In a possible embodiment, the global routing policy generates a unique routing key value by using a unique user code generated by an email or a contact number provided by the user when registering through information summarization and encryption while marking a place to which a data belongs and synchronizing to the global user center for storage.

In a second aspect, the invention provides a routing-policy-based global user compliance access apparatus, which includes a unified user gateway, an authentication unit, an application program interface, a local user center, a global user center, and a remote user center, wherein a user initiates a login request to the unified user gateway when the user initiates a login behavior; the unified user gateway routes the login request to the authentication unit; the authentication unit sends an authenticated user request to the local user center for processing, and to the global user center for global query if the user is a non-local user; failure results are directly returned if the global query fails, and otherwise a routing information to which the user belongs is returned according to the global routing policy and redirected to the remote user center to which the user belongs for request processing;

the user initiates a business request to the unified user gateway when the user initiates a business operation behavior; the unified user gateway routes the business request to the authentication unit; the business request is routed to the application program interface after being passed by the authentication unit; the application program interface sends the business request to the local user center for business processing, and to the global business center for routing policy query and redirects to the remote user center to which the user belongs for request processing if the user is the non-local user.

In a possible embodiment, the global query performs retrieval based on a global routing policy.

In a possible embodiment, the business operation includes at least one of global data duplication judgment, basic information modification and basic information query.

In a possible embodiment, the global routing policy generates a unique routing key value by using a unique user code generated by an email or a contact number provided by the user when registering through information summarization and encryption while marking a place to which a data belongs and synchronizing to the global user center for storage.

In a third aspect, the invention provides an electronic device, which includes a processor and a memory storing a computer-executable instruction; the executable instruction, when executed, causes the processor to execute the routing-policy-based global user compliance access method according to any one of the above.

In a fourth aspect, the invention provides a computer-readable storage medium, which is stored with one or more programs; the one or more programs, when executed by the processor, implement the routing-policy-based global user compliance access method according to any one of the above.

With the invention, there are the following beneficial effects: the global user center provides unified storage and global routing policies for user data information belonging to different geographical centers so that unified login and authorization at any site around the world may be realized for users in different geographical centers while ensuring that user data is compliant.

BRIEF DESCRIPTION OF THE DRAWINGS

FIG. 1 is a flow chart of steps of a routing-policy-based global user compliance access method according to an embodiment of the invention;

DETAILED DESCRIPTION OF THE INVENTION

Figure 2:
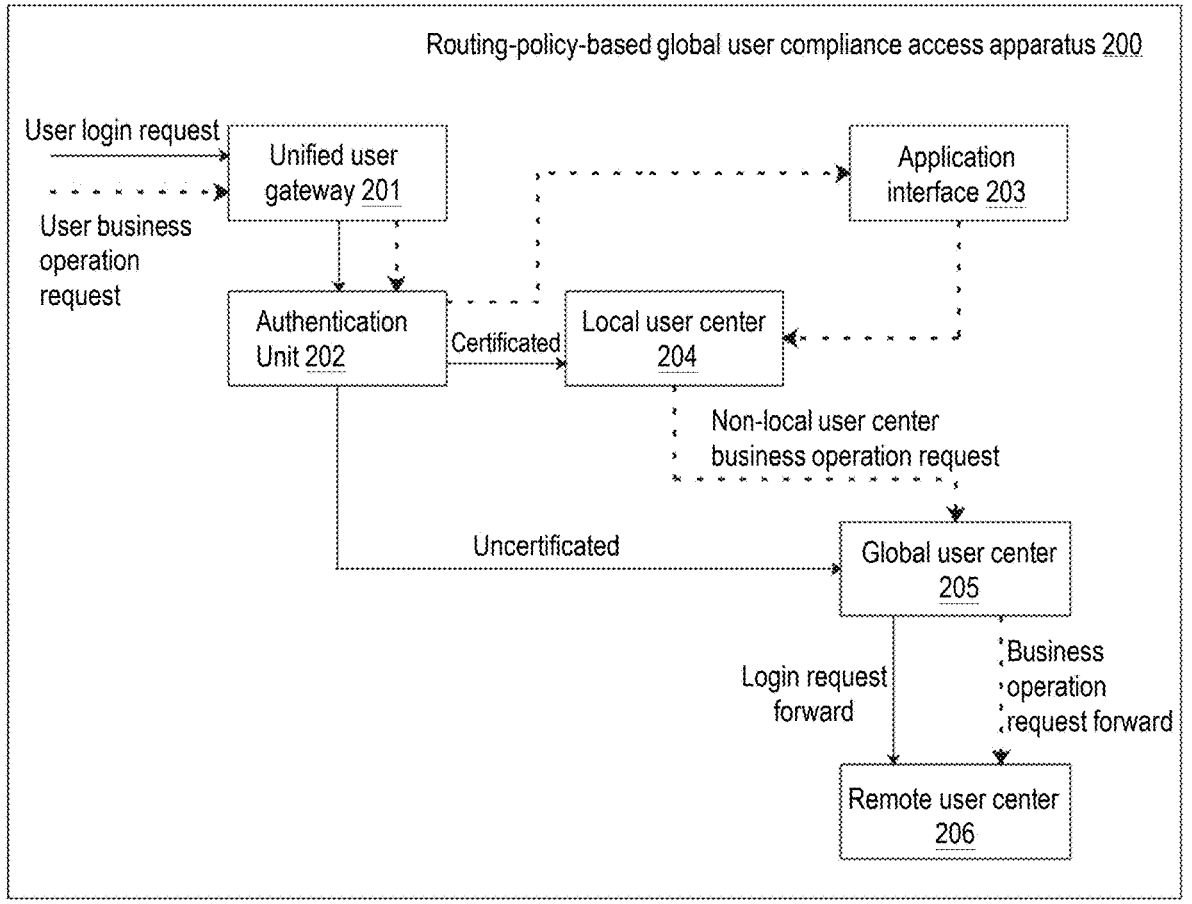
FIG. 2 is a block view of principles of a routing-policy-based global user compliance access apparatus according to an embodiment of the invention.

Clear and complete description will be made to the technical solutions in embodiments of the present invention in conjunction with drawings in the embodiments of the present invention hereafter. Obviously, the described embodiments are merely a part of embodiments of the present invention and not all the embodiments. Based on the embodiments of the disclosure, all other embodiments obtained by a person skilled in the art without involving any inventive effort are within the scope of the disclosure.

Before describing the specific embodiments of the invention, in order to make the solution of the invention more clear and complete, the abbreviations and key terms appearing in the invention are first explained as follows:

Routing information: the 'routing information' used in the invention refers to the information generated by the static routing configured by the user or the routing learned by the protocol. The routing information mainly includes 'key-value information' and 'non-key-value information'; the 'non-key-value information' contains address information related to the next hop, so the 'non-key-value information' is also called 'next-hop information'. The 'next-hop information' may contain one or more next-hop-related address information.

Routing key-value: the routing key-value is generally stored in a routing key-value table or included in the routing information; the routing key-value table is a table maintained by the software; the routing key-value table stores a routing key-value information in the routing information. Each entry of the routing key-value table may be associated with at least 1 entry of a next-hop table. The entry of the routing key-value table may store an index of the entry of the next-hop table, or an index query method of the next-hop table may be also used to query specific entries of the next-hop table.

'Redirect' is to redirect various network requests to other locations through various methods (e.g., web page redirect, domain name redirect, and routing changes are also a 'redirect' of the path that data packets take).

KYC certification ('Know Your Customer' certification). The main goal of 'Know Your Customer' is to effectively detect and report suspicious behavior through the verification of user identity and understanding of business behaviors, because unless the user is fully understood and the business behavior of the user may be predicted, it is impossible to reasonably and effectively detect abnormal or perhaps suspicious behavior from the daily and habitual behaviors of the user. KYC Certification is usually inseparable from AML (Anti Money Laundering), which are professional terms in the financial field. KYC account certification is generally divided into two types, wherein the first is personal account certification, and the second is corporate account certification. KYC rules refer to 'Know Your Customer Rules'.

First Embodiment

Figure 1:
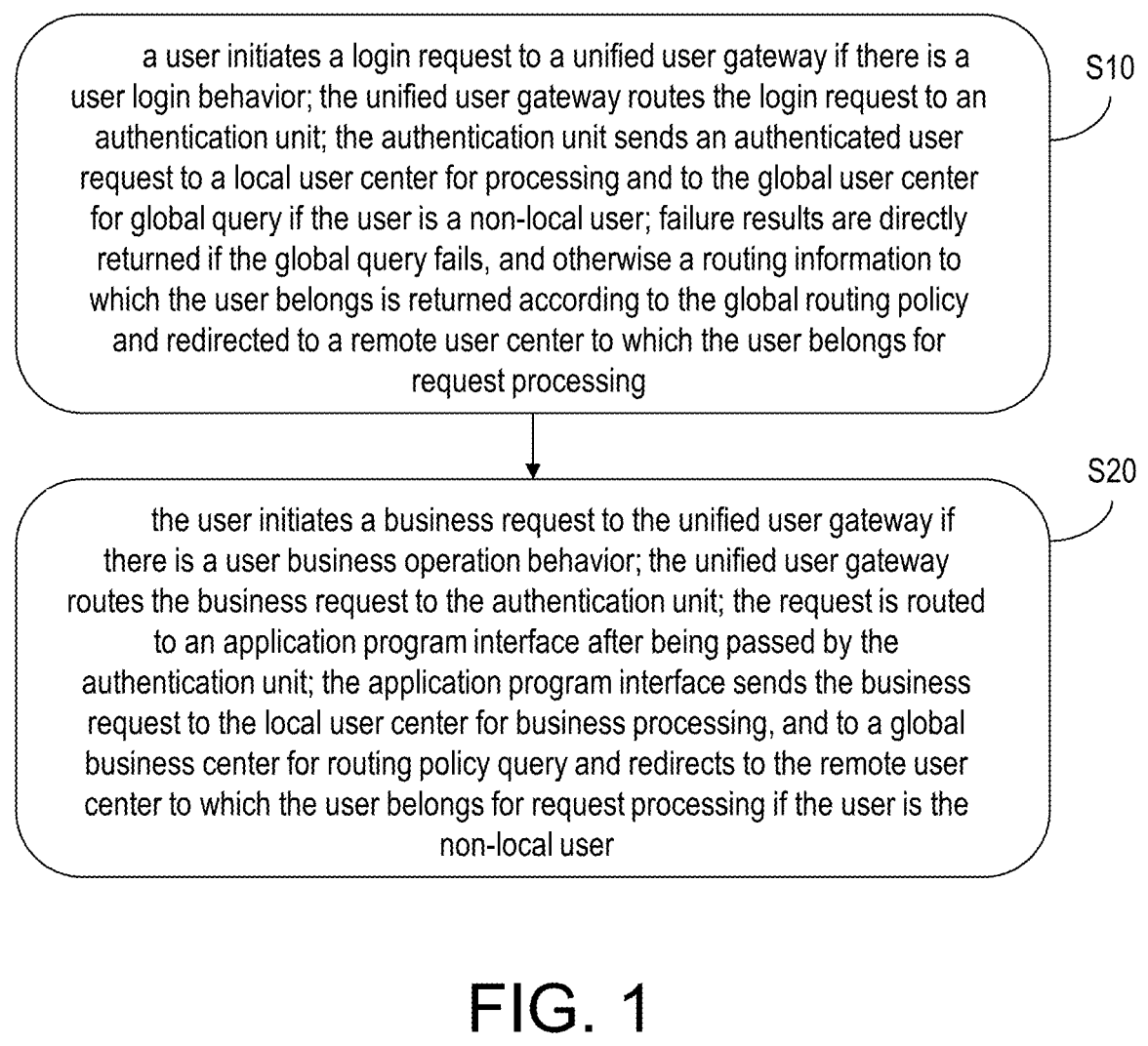

With reference to FIG. 1, a flow chart of steps of a routing-policy-based global user compliance access method according to an embodiment of the invention is shown. Based on the subsequent routing-policy-based global user compliance access network, it is configured to implement the following steps:

S10, a user initiates a login request to a unified user gateway if there is a user login behavior; the unified user gateway routes the login request to an authentication unit; the authentication unit sends an authenticated user request to a local user center for processing and to the global user center for global query if the user is a non-local user; failure results are directly returned if the global query fails, and otherwise a routing information to which the user belongs is returned according to the global routing policy and redirected to a remote user center to which the user belongs for request processing;

S20, the user initiates a business request to the unified user gateway if there is a user business operation behavior; the unified user gateway routes the business request to the authentication unit; the request is routed to an application program interface after being passed by the authentication unit; the application program interface sends the business request to the local user center for business processing, and to a global business center for routing policy query and redirects to the remote user center to which the user belongs for request processing if the user is the non-local user.

With the routing-policy-based global user compliance access method configured above, regardless of the login behavior or the business operation behavior of the user, the global user center provides unified storage and global routing policies for user data information belonging to different geographical centers so that unified login and authorization at any site around the world may be realized for users in different geographical centers while ensuring that user data is compliant.

In an embodiment, the business operation includes at least one of global data duplication judgment, basic information modification and basic information query. The global data duplication judgment includes, e.g., checking whether the contact number (may be a mobile phone number) and the email address already exist. The basic information may include mobile phone, email, contacts, security questions, contact address, password, etc.

In an embodiment, the global query performs retrieval based on a global routing policy. The global routing policy generates a unique routing key value by using a unique user code generated by an email or a contact number provided by the user when registering through information summarization and encryption while marking a place to which a data belongs and synchronizing to the global user center for storage.

Corresponding to the method embodiment, with reference to FIG. 2, a block view of principles of a routing-policy-based global user compliance access apparatus 200 is shown, which includes a unified user gateway 201, an authentication unit 202, an application program interface 203, a local user center 204, a global user center 205, and a remote user center 206, wherein when a user initiates a login request to the unified user gateway 201 when the user initiates a login behavior; the unified user gateway 201 routes the login request to the authentication unit 202; the authentication unit 202 sends an authenticated user request to the local user center 204 for processing, and to the global user center 205 for global query if the user is a non-local user; failure results are directly returned if the global query fails; otherwise, a routing information to which the user belongs is returned according to the global routing policy and redirected to the remote user center 206 to which the user belongs for request processing; the user initiates a business request to the unified user gateway 201 when the user initiates a business operation behavior; the unified user gateway 201 routes the business request to the authentication unit 202; the request is routed to the application program interface 203 after being passed by the authentication unit 202; the application program interface 203 sends the business request to the local user center 204 for business processing, and to the global business center 205 for routing policy query and redirecting to the remote user center 206 to which the user belongs for request processing if the user is the non-local user.

With the routing-policy-based global user compliance access apparatus configured above, regardless of the login behavior or the business operation behavior of the user, the global user center provides unified storage and global routing policies for user data information belonging to different geographical centers so that unified login and authorization at any site around the world may be realized for users in different geographical centers while ensuring that user data is compliant.

In an embodiment, the business operation includes at least one of global data duplication judgment, basic information modification and basic information query. The global data duplication judgment includes, e.g., checking whether the contact number (may be a mobile phone number) and the email address already exist. The basic information may include mobile phone, email, contacts, security questions, contact address, password, etc.

In an embodiment, the global query performs retrieval based on a global routing policy. The global routing policy generates a unique routing key value by using a unique user code generated by an email or a contact number provided by the user when registering through information summarization and encryption while marking a place to which a data belongs and synchronizing to the global user center for storage.

Figure 3:
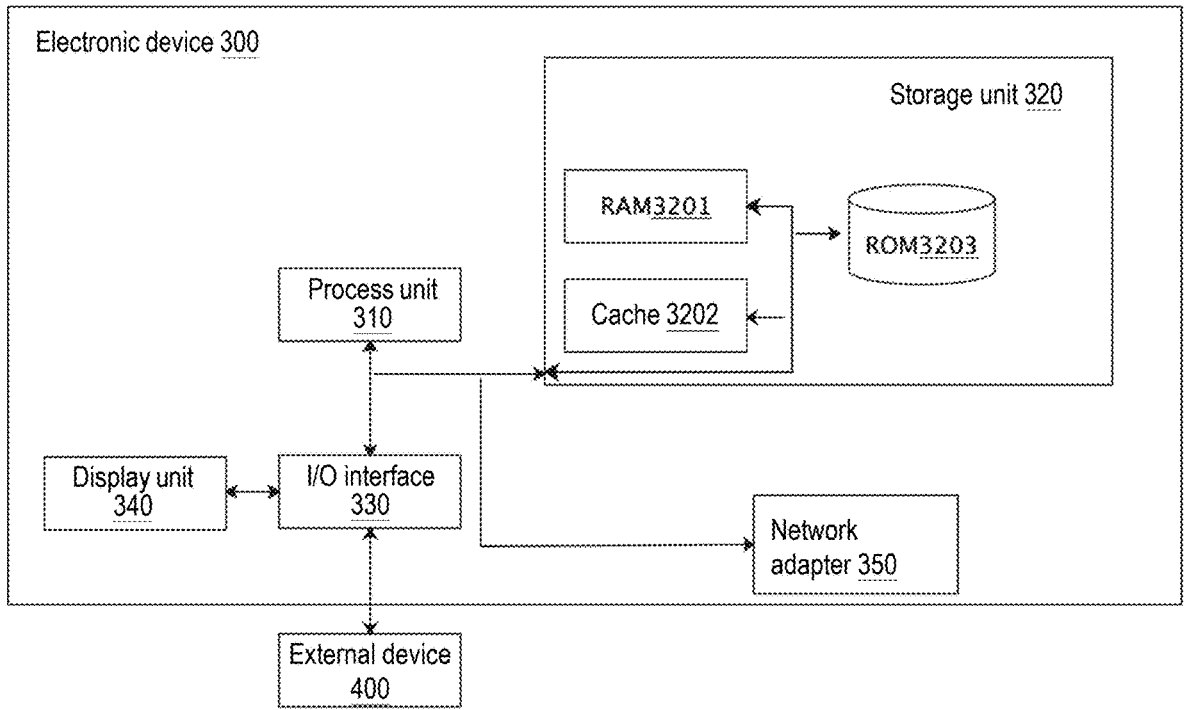
FIG. 3 is a block view of principles of an electronic device according to an embodiment of the invention.

With reference to FIG. 3, a structural diagram of an electronic device according to an embodiment of the invention is shown. The electronic device 300 shown in FIG. 3 is merely an example, and should not bring any limitation to the functions and application scope of the embodiments of the invention. The electronic device 300 is represented as a general-purpose computing device. The components of the electronic device 300 may include, but are not limited to: at least one processing unit 310, a bus connecting different device components (including a storage unit 320 and the processing units 310), an I/O interface 330, a display unit 340, and the like. The storage unit is stored with program codes, which may be executed by the processing unit 310, so that the processing unit 310 performs the steps according to various exemplary embodiments of the invention described in the section on the routing-policy-based global user compliance access method. For example, the processing unit 310 may execute the following steps:

S10, a user initiates a login request to a unified user gateway if there is a user login behavior; the unified user gateway routes the login request to an authentication unit; the authentication unit sends an authenticated user request to a local user center for processing and to the global user center for global query if the user is a non-local user; failure results are directly returned if the global query fails, and otherwise a routing information to which the user belongs is returned according to the global routing policy and redirected to a remote user center to which the user belongs for request processing;

S20, the user initiates a business request to the unified user gateway if there is a user business operation behavior; the unified user gateway routes the business request to the authentication unit; the request is routed to an application program interface after being passed by the authentication unit; the application program interface sends the business request to the local user center for business processing, and to a global business center for routing policy query and redirects to the remote user center to which the user belongs for request processing if the user is the non-local user.

The storage unit 320 may include a readable medium in the form of a volatile storage unit, such as a random access storage unit (RAM) 3201 and/or a cache storage unit 3202, and may further include a read-only storage unit (ROM) 3203. The storage unit 320 may further include a program/utility having a set of (at least one) program modules. The program modules include but are not limited to: operating devices, one or more application programs, other program modules and program data. Each of these examples, or some combination, may include the implementation of a network environment.

The bus may be represented by one or more of several types of bus structures, including a storage unit bus or a storage unit controller, a peripheral bus, a graphics acceleration port, a processing unit, or a local bus using any of a plurality of bus structures.

The electronic device 300 may also communicate with one or more external devices 400 (such as a keyboard, a pointing device, or a Bluetooth, etc.), and may also communicate with one or more devices that enables a user to interact with the electronic device 300, and/or any devices (such as routers, modems, etc.) that enable the electronic device 300 to communicate with one or more other computing devices. This communication may be performed through the input/output (I/O) interface. In addition, the electronic device 300 may further communicate with one or more networks (for example, a local area network (LAN), a wide area network (WAN), and/or a public network, such as the Internet) by using a network adapter 350. The network adapter 350 may communicate with other modules of the electronic device 300 through the bus. The electronic device 300 displays information to be displayed through the display unit 340. It should be understood that although not shown in FIG. 3, other hardware and/or software modules may be used in conjunction with the electronic device 300, including but not limited to: microcode, a device drive, a redundant processing unit, an external disk drive array, a RAID apparatus, a tape drive, a data backup storage apparatus, and the like.

Through the above description of the embodiments, those skilled in the art can easily understand that the exemplary embodiments described in the invention can be implemented by software, or can be implemented by software combined with necessary hardware. Therefore, the technical solutions according to the embodiments of the invention can be embodied in the form of software products; the software product can be stored in a computer-readable storage medium (may be CD-ROM, USB flash drive, mobile hard disk, etc.) or on the network, which includes several instructions to enable a computing device (which may be a personal computer, a server, a network device, etc.) to execute the routing-policy-based global user compliance access method according to the invention. When the computer program is executed by a data processing device, the computer-readable storage medium is enabled to implement the above method of the invention, which includes the following steps:

S10, a user initiates a login request to a unified user gateway if there is a user login behavior; the unified user gateway routes the login request to an authentication unit; the authentication unit sends an authenticated user request to a local user center for processing and to the global user center for global query if the user is a non-local user; failure results are directly returned if the global query fails, and otherwise a routing information to which the user belongs is returned according to the global routing policy and redirected to a remote user center to which the user belongs for request processing;

S20, the user initiates a business request to the unified user gateway if there is a user business operation behavior; the unified user gateway routes the business request to the authentication unit; the request is routed to an application program interface after being passed by the authentication unit; the application program interface sends the business request to the local user center for business processing, and to a global business center for routing policy query and redirects to the remote user center to which the user belongs for request processing if the user is the non-local user.

The computer program may be stored on one or more computer-readable media. The computer-readable medium may be a readable signal medium or a readable storage medium. The readable storage medium may be, but not limited to, an electrical, magnetic, optical, electromagnetic, infrared, or semiconductor apparatus, apparatus, or device, or any combination thereof. More specific examples (in a non-exhaustive list) of the readable storage medium include: an electrical connection to one or more wires, a portable disk, a hard drive, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

The computer-readable storage medium may include a data signal propagated in a baseband or as a part of a carrier, and readable program codes are carried therein. This propagated data signal can take many forms, including but not limited to an electromagnetic signal, an optical signal, or any suitable combination thereof. The readable storage medium may also be any readable medium other than the readable storage medium, and the readable medium may send, propagate, or transmit a program used by or combined with the instruction execution apparatus, apparatus, or device. The program code included in the readable storage medium may be transmitted by any suitable medium, including but not limited to a wireless medium, a wire, an optical cable, RF, and the like, or any suitable combination thereof.

The program codes for performing the operations of embodiments of the invention may be written in any combination of one or more programming languages. The program code may be executed entirely on a computing device of a user, partly on a computing device of a user, executed as an independent software package, partly on a computing device of a user and partly executed on a remote computing device, or entirely executed on a remote computing device or server. In a case of the remote computing device, the remote computing device may be connected to the computing device of the user through any type of network including a local area network (LAN) or a wide area network (WAN), or may be connected to an external computing device (for example, through the Internet by using an Internet service provider).

Second Embodiment

Figure 4:
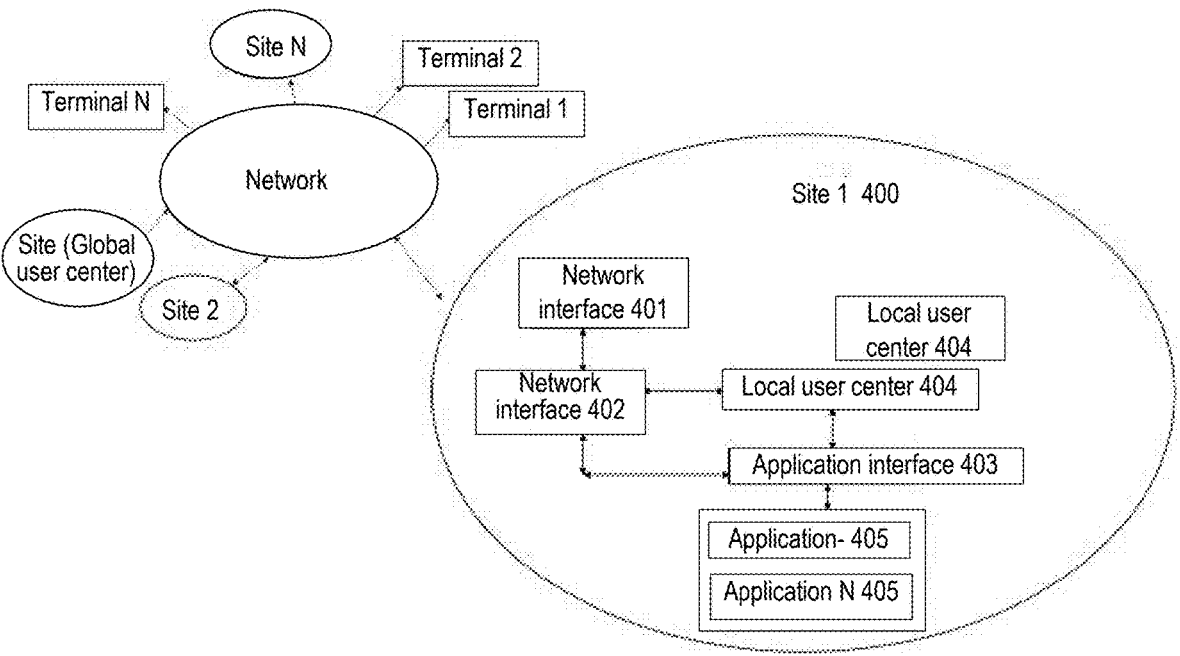
FIG. 4 is a map of sites that users access in compliance with regulations.
Figure 5:
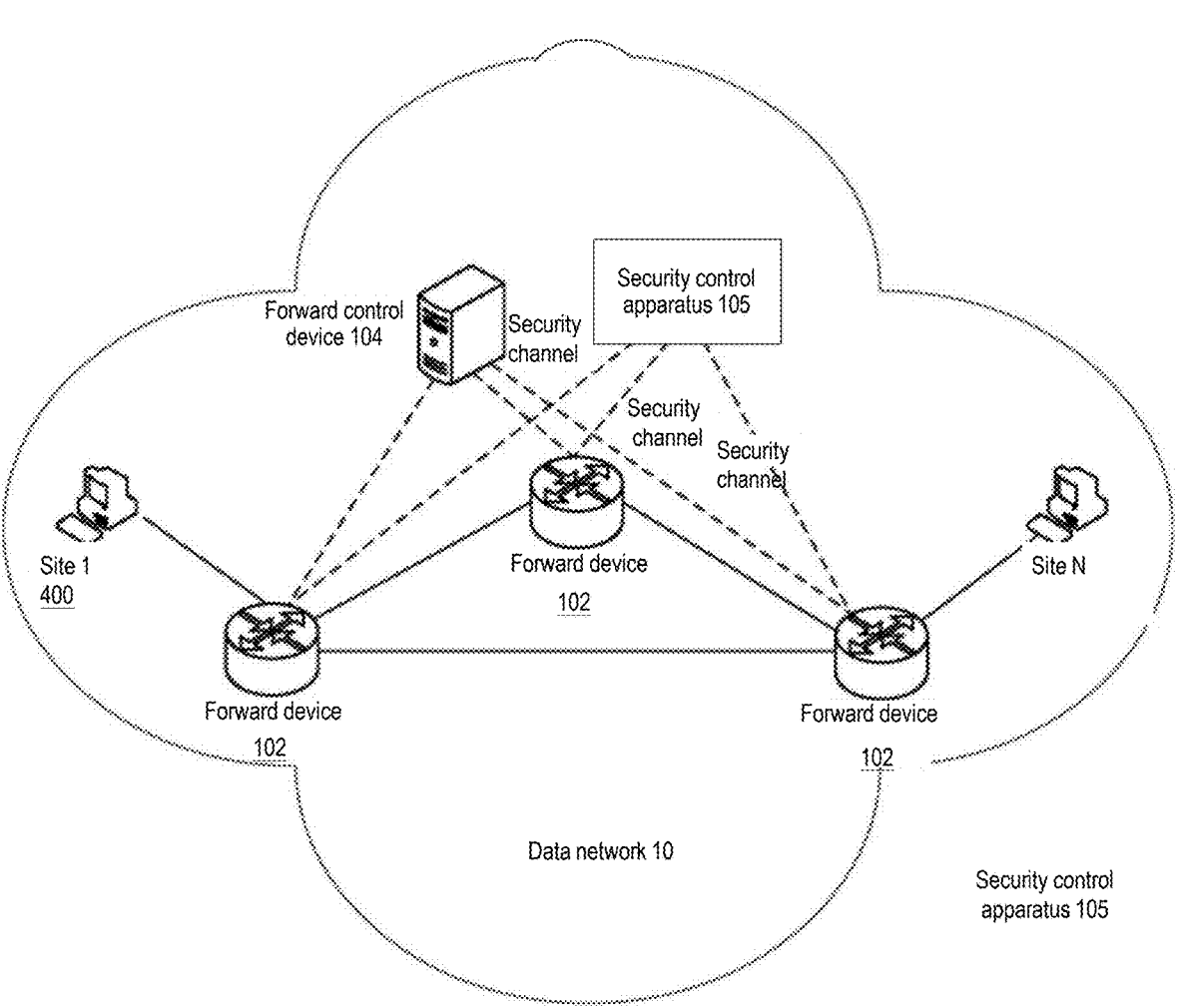
FIG. 5 is an example view of principles of a routing-policy-based global user compliance access system according to the invention.

With reference to FIG. 4 and FIG. 5, wherein FIG. 4 is a map of sites that users access in compliance with regulations, and FIG. 5 is an example view of principles of a routing-policy-based global user compliance access system according to the invention is shown. A site 400 may have different control points in the system to complete operations such as registration, login, security control, access, and business management and control for the compliant access of the user. There may be a plurality of sites 400, and the global business center may also be a special site. The sites may be connected through the Internet. The site 400 for the user compliance access may provide a number of capabilities, with the overall goal of intelligently using the breadth and depth of information available about the operations and activities of computing instances and networks and the various available controls, so as to complete the registration, login, security control, access, business management and control of the entire system (or platform) for each user terminal. And it completes the access, interaction and security management for each user with the global business center and other sites.

As used herein, the terms 'client', 'user' and 'user terminal' may refer to one or more client-side apparatuses or systems used to initiate or facilitate transaction, payment and other business control, or registration, or access, etc. (e.g., located at the remote location of the payment service provider). By way of example, the 'client apparatus' may refer to one or more host computers, one or more mobile devices used by a user, or the like. In some non-limiting embodiments or aspects, the client apparatus may be an electronic apparatus configured to communicate with one or more networks and initiate or facilitate transactions. For example, the client apparatus may include one or more computers, portable computers, laptops, tablets, mobile devices, cellular phones, wearable devices (e.g., watches, glasses, lenses, clothing, etc.), PDAs, and the like. In addition, the 'client' may also refer to an entity that owns, utilizes and/or operates the client apparatus for initiating service management and control, or registration, or access.

As used herein, the terms 'site', 'server' may refer to one or more computing apparatuses (e.g., processors, storage apparatuses, similar computer components, etc.) that communicate with client apparatuses and/or other computing apparatuses and in some examples facilitate communications between other servers and/or client apparatuses via a network (public network, Internet, private network, etc.). It should be understood that various other arrangements are possible. As used herein, the term 'system' may refer to one or more computer apparatuses or a combination of computer apparatuses (e.g., processors, servers, client apparatuses, software applications, components of these computer apparatuses, etc.). References to the 'device', 'server', 'processor', etc. as used herein may refer to a previously-stated apparatus, server or processor stated to perform a previous step or function, a different server or processor, and/or a combination of servers and/or processors. For example, as used in Specification and Claims, the first server or the first processor stated to perform a first step or a first function may refer to the same or a different server or the same or a different processor stated to perform a second step or a second function.

The sites for the user compliance access may define and enforce policies that control access to and use of compute instances, networks, and data. The administrator may update the policies, for example, by specifying authorized users and conditions for use and access. The sites for the user compliant access can be updated and enforce those policies at the various control levels available, e.g., controlling what network traffic is allowed through firewalls and wireless access points by bootstrapping the compute instance, what applications and data are available from the server, what applications and data the endpoint is allowed to access, and what network resources and data the endpoint is allowed to run and use.

The sites for the user compliant access may provide many different services, and routing policy management may be provided as one of the services.

To describe certain capabilities and components of the sites for the user compliant access, an exemplary site may be or may include any computer-based networked infrastructure. For example, user terminals accessing the site may be companies, businesses, organizations, education, government, etc. As networks in the home become more complex, the computer network of user terminals may be distributed across multiple physical locations, such as buildings on a campus, and located in one or more geographic locations. The configuration of an enterprise facility as shown is exemplary only; it is understood that there may be any number of compute instances, fewer or more of each type of compute instance, as well as other types of compute instances. As shown, the sites for the user compliant access may include firewalls, wireless access points, endpoints, servers, mobile devices, devices or IoT devices, cloud computing instances and servers. Similarly, there may also be one or more gateways, bridges, wired networks, wireless networks, virtual private networks, other computer devices, etc. In the same way, the user terminals may be wireless access points, endpoints, servers, mobile devices, appliances or IoT devices.

The sites for the user compliant access may include a network interface 401, an authentication unit 402, a local user center 404, an application program interface 403 and various application programs 405. The network interface 401 may be various interfaces for network interaction. When the local user center 404 and the application program 405 are on the same computer terminal, the application program interface 403 may not be needed.

The authentication unit 402 is configured and/or configured to pre-configure authentication parameters, authentication algorithms, and route analysis. The authentication unit 402 may be connected through a security control device (a security channel) to at least one site for the user compliant access controlled by the authentication unit, and uses the sites for the user compliant access to configure authentication parameters, authentication algorithms and route analysis; the authentication unit 402 may also be directly installed in each of the sites. In a possible implementation, the authentication unit 402 may include a processor, a memory, and a transceiver. A certain server or additional security control apparatus of the sites for the user compliant access generates a routing table and receives authentication parameters, authentication algorithms and route analysis for authentication, and sends the routing table, the authentication parameters and the authentication algorithm to the transceiver, so that the transceiver performs authentication and message forwarding. The authentication parameters are used for authentication of the corresponding site. Any parameters that can be used for authentication may be used as the authentication parameters described herein. The embodiments of the invention do not specifically limit the types of authentication parameters. For example, the authentication parameters may include a key, a random number, or a salt value. Or, the authentication parameters may also be other types of parameters, which will not be described one by one here, and the above examples do not constitute specific limitations. Optionally, the authentication algorithm may include an encrypted HASH algorithm, or a non-encrypted HASH algorithm. The HASH algorithm may also be called a hash function. The encrypted HASH algorithm has high security but consumes a lot of performance. The non-encrypted HASH algorithm has low security but saves performance. The type of authentication algorithm may be flexibly selected according to the actual scenario, and this is not specifically limited in the embodiments of the invention. Further, the authentication parameters may be continuously updated to make up for the lack of security of the non-encrypted HASH algorithm. For example, the encrypted HAS algorithms may include message digest algorithm (MD) 5, secure hash algorithm (SHA) 512, SHA1, etc. The non-encrypted HASH algorithms may include murmurHASH3, cyclic redundancy check (CRC) 32, etc. The route analysis is based on received packets. With reference to FIG. 5, the security control device 105 and the authentication unit 402 may also be configured independently of the site. The processor of the authentication unit 402 in the invention may further include a configuration unit and a route analysis unit. The configuration unit further includes configuring routing policies including authentication parameters and authentication algorithms. Generally speaking, the routing policy of the configuration unit is related to the local user center 404. At the same time, the route analysis is performed according to a pre-set routing policy. This section is described together with those for the local user center 404.

The local user center 404 is used for local user management, including registration, login authentication, and interaction with the global user management of the global business center. The local user center 404 may also include a processor and a memory, or a server and various databases. The memory may comprise a volatile memory, such as a random-access memory (RAM); the memory may further include a non-volatile memory, such as a read-only memory (ROM), a flash memory, a hard disk drive (HDD) or a solid-state drive (SSD); and the memory may further include a combination of the above memories for storing various user information that may implement the application system, including registration information, login information, etc. The processor may be a central processing unit (CPU), or an application specific integrated circuit (ASIC), or one or more integrated circuits configured to implement embodiments of the invention, such as one or more digital signal processors (DSP), or one or more field programmable gate arrays (FPGA).

The local user center 404 and the global business center may exchange data through the network (such as routing, Internet, etc.). Data exchange between them may also be carried out through dedicated wires. The global business center may also be a special site, and may also include a network interface, an authentication unit and a global user center. The network interface may communicate data with various other sites over the network. The authentication unit implements authentication and analysis of received data messages. The global user center is used to store login data, registration data and access data of global users, and may also include other users to operate various applications. In addition, the global business center may also be a virtual site, and the corresponding services of the global business center are dispersed in each local user center 404.

The local user center 404 is further described, which includes a processor and a memory, or a server and a database. If the local user center 404 stores enough data, it may also be a storage cluster. The processor further includes a registration processing unit, a login processing unit, and a processing unit that interacts with the global business center.

the registration request of the user in the memory. The information includes one or a combination of the following: an email address, a mobile phone number provided when the user registers, a status of KYC certification, a business identification to be carried out, a business status, a certification subject identification, etc.

How to legalize the compliance of sensitive information, mainly including how to find commonalities and differentiated shielding and elimination of different data due to different login habits, so as to mark the data, so that the identification data storage in the global user center solves the problem of long link transmission when logging in from a remote location.

For privacy or sensitive information stored in the local user center, the local user data is marked separately in the registration processing unit or/and login processing unit that can be set in the local user center, and the routing policy is stored by the configuration unit in the authentication unit according to the user information.

The routing policy is a routing key value generated by segmented confusion calculations through login information, basic information, business information, status bits, etc. for information summarization and encryption after hierarchical operation on the email, mobile phone, KYC status, business identification, business status, certificated subject identification, region, etc. provided by the user when registering, while marking the location of the data and synchronizing to the global center for storage (for example, the authentication unit is subjected to hierarchical operation according to the routing policy and then stored in the user global center); the location is generally determined from the local user center visited for the first registration, and if real-name certification is involved in subsequent business, there will be certain compliance policies to appropriately change the region according to the region where the business is conducted.

An exemplary composition of a routing policy (shown in Table 1-1 below):

TABLE 1-1

| | Hierarchy rule | Detailed content | Example of generation |
|---|---|---|---|
| Routing policy hierarchy | Login information | E-mail<br>Mobile phone<br>User name | Character salt string are Randomly generated to be spliced with plaintext information to confuse the original |
| | Basic information | KYC status (final)<br>Subject identification (mainly 'type') | information.<br>Values in step 1 are used to calculate the HASH values using the MD5 |
| | Business information | Business identification<br>Business activation status | algorithm.<br>AES encryption |
| | Status bit | Activation status (activated/inactive)<br>Lock status (locked/unlocked)<br>Review status (reviewed/unreviewed) | |
| | Area | Data landing area identification | |
| User code | | Fixed region number<br>Request timestamp<br>Random string<br>Single zone atom<br>auto-increment bond (atom auto-increment setting in this zone) | |

The registration processing unit is used to receive a registration request of the user and store relevant information in Another exemplary composition of a routing policy (shown in Table 1-2 below):

TABLE 1-2

| | Hierarchy rule | Detailed content | Example of generation |
|---|---|---|---|
| Routing policy hierarchy | Login information | E-mail<br>Mobile phone<br>User name | Character salt string are Randomly generated to be spliced with plaintext information to confuse the original |
| | Basic information | KYC status (final)<br>Subject identification (mainly 'type') | information.<br>(Refer to the following section for non-sensitive scenarios, which can |
| | Business information | Business identification<br>Business activation status | also be used as pre-enhancement in step 2) |
| | Status bit | Activation status (activated/inactive)<br>Lock status (locked/unlocked)<br>Review status (reviewed/unreviewed) | or base64 encode;<br>or XOR operation;<br>or base conversion (binary, hexadecimal);<br>values in step 1 are used to calculate |
| | Area | Data landing area identification | the HASH values using the MD5 algorithm;<br>or hmac to get the hash values;<br>or sha1 to get the hash values;<br>or sha2 (sha-224, sha-256, sha-384, sha-512) to get the hash values;<br>AES encryption, des, 3des may also be selected according to special scenarios, RSA, ecc |
| User code | | Fixed region number<br>Request timestamp<br>Random string<br>Single zone atom<br>auto-increment bond (atom auto-increment setting in this zone) | |

The user code logic may be as shown in Table 2 below (Table 2 is only an example)

TABLE 2

| | Fixed type code | Area Code | Request Timestamp | Random String | Single Zone Atomic Self-increment Key |
|---|---|---|---|---|---|
| Composition | 4-6 Characters | e.g., 86 | yymmddhh | 3 Digit Random Number | 1-7 Digits |

The user code is composed of a fixed regional number, a request timestamp, a random string, and a single-zone atomic auto-increment key through the local center after confirming that registration is possible by correlating the information provided by the user during registration; the unique code of the user and the summarization information of the segments confusing the email or a mobile phone together form the routing policy. Through this policy, attention should not be paid to the registration methods and verification forms of different countries and regions, and the global routing key is used to confirm that different local user centers perform compliant information access and authentication when the local user center finds no evidence, thereby shielding and eliminating discrepancy issues.

Based on the above system, the invention further describes a routing-policy-based global user compliance access method.

A routing-policy-based global user compliance access method includes the following steps:

S1: a user initiates a login request to a unified user gateway if there is a user login behavior, the unified user gateway routes the login request to an authentication unit, and the authentication unit sends an authenticated user request to a local user center for processing and to the global user center for global query if the user is a non-local user, which specifically include the following steps.

The local user center initiates a compliance access certification operation for the user if the local user center that receives an access request determines that the user of the access request is the non-local user when the user performs the access request:

an information including a user code information, a basic information, a business information, and a user status information are divided into corresponding hierarchies according to a preset routing hierarchical rule and configuring each routing hierarchical information, the user code information carrying a region code information of a remote user center where the user is registered;

relevant confusion calculations are performed on each of the hierarchies respectively, and then a sensitive data involved in the corresponding routing hierarchical information is encrypted to form a desensitized information corresponding to each of the hierarchies;

the desensitized information of each of the hierarchies are combined into a segment routing label to form a routing key-value pair;

routing key values of all hierarchies are formed into the routing key-value pairs corresponding to a certification request.

S2: failure results are directly returned if the global query fails, and otherwise a routing information to which the user belongs is returned according to the global routing policy and redirected to a remote user center to which the user belongs for request processing, which specifically include the following steps:

the global user center parses the segment routing label from the routing key-value pair, and finds the routing hierarchical information containing the user code information through the segment routing label to obtain the region code information of the remote user center where the user is registered for obtaining a network address information of the remote user center;

S3: failure results are directly returned if the global query fails, and otherwise a routing information to which the user belongs is returned according to the global routing policy and redirecting to a remote user center to which the user belongs for request processing, which specifically include the following steps:

the remote user center receives the routing key-value pair corresponding to the certification request to parse the corresponding information according to the preset routing hierarchical rule for completing the compliance access certification.

The performing relevant confusion calculations on each of the hierarchies respectively further includes the following steps: a salt value for each of the hierarchies is randomly generated, the salt value is confused with the routing hierarchical information of the hierarchy according to a preset rule, and then a Hash result is obtained through a summarization algorithm MD5.

One way is: the global user center is a separate user center, i.e., a separate site. When the global user center receives the routing key-value pair corresponding to the certification request, according to the pre-set routing hierarchical rules and pre-confusion rules, it is only necessary to parse the information of the routing hierarchy where the code information of the user is located, and then parse the network address information of the remote user center (i.e., the local user center where the user is registered) carried in the user code from the hierarchy. Through the network address information, the routing key-value pair corresponding to the certification request may be redirected to the remote user center. After parsing out the information corresponding to each hierarchy, the remote user center certificates the user according to the local certification rules. If the access contains business requirements, the business requirements may be processed based on the parsed information, and the processing results or certification results are returned to the user or to the local user center that initiates the certification. In this way, on the one hand, sensitive information may be prevented from being disclosed directly on the Internet, and various certification or business processing may be completed quickly and directly without affecting network security. If the information is to be returned to the local user center that initiates the certification, the area code of the local user center that initiates the certification is included in the early design for routing hierarchies.

One way is: the global user center is not an independent site, but may be a virtual user center; the global user center may store user information in each independent local user center in segments. In other words, the local user center is divided into a user data area that stores global user center and a user data area that stores local user data. When the global user center receives the routing key-value pair corresponding to the certification request, it may be necessary to route to multiple 'User Data Areas for Saving Global User Centers' to parse out the network address information of the corresponding remote user centers, which, however, does not affect the invention and creation of the invention.

Figure 6:
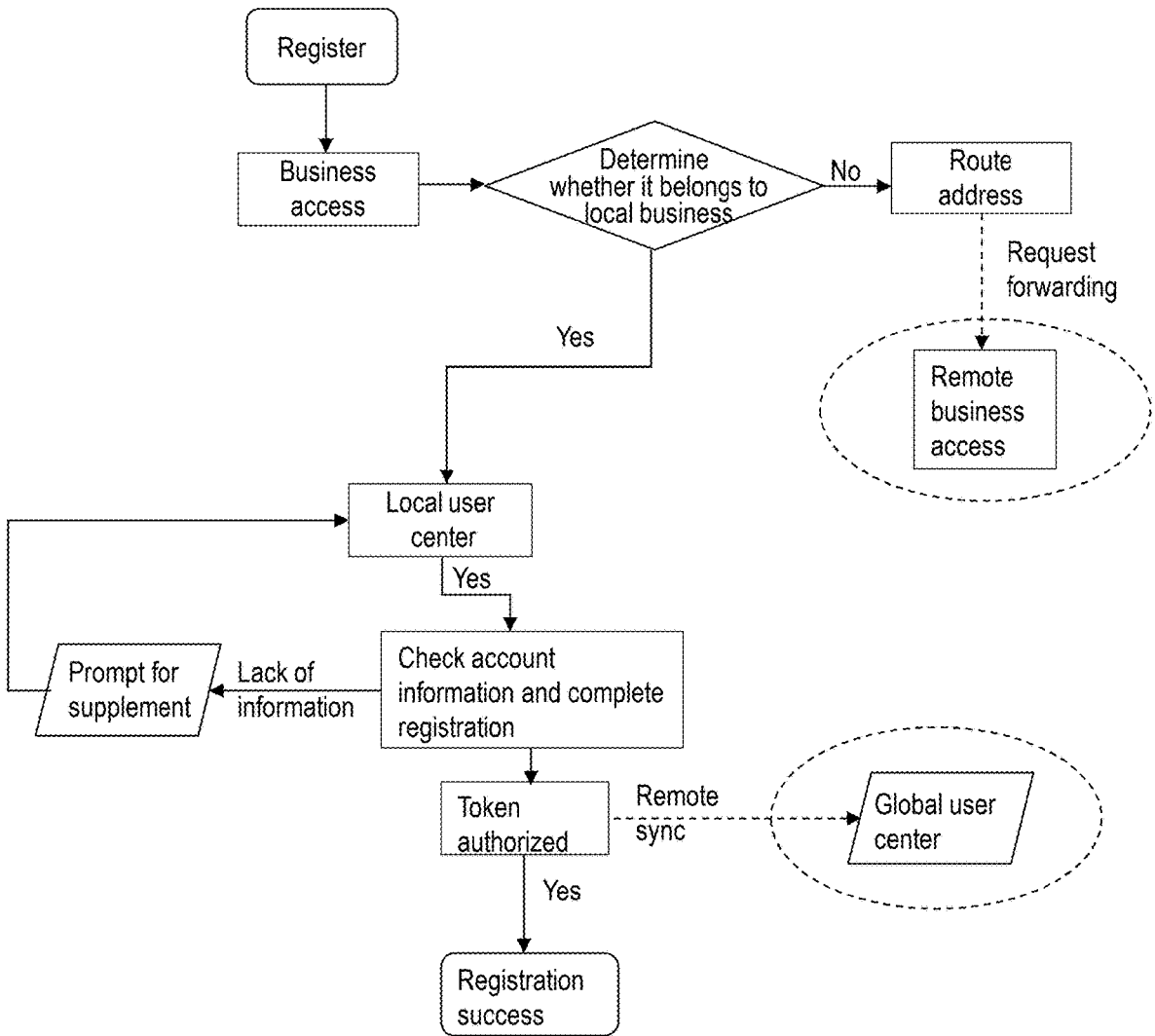
FIG. 6 is a flow chart of a registration process for users.

The specific implementation process of the method is:

Registration process for users (refer to FIG. 6):

when a user makes a user registration request to the platform through the terminal, a certain site (an independent server may be set up separately) determines whether the business required by the registration request at the terminal is a business that may be accessed by the site or the local domain, wherein if the user enters the local user center, the information required for user registration ((user attribute information (such as email, mobile phone, user name, etc.), user characteristic information (KYC information, corresponding subject information if the user is a company), business information (business name, business identification, business special information)) will be stored, the registration will be completed, and the authorized token will be returned to the corresponding user terminal to synchronize the information to the global user center.

In addition, a user code is generated when the user registers, and the user code is composed of the regional number fixed by the local center (i.e., the regional number attached to the site), the request timestamp, a random string, and a single-region atomic auto-increment key after the information provided by the user when registering is associated and confirmed to be registered.

The uniqueness of the user code may make the code and the segmented summarization information of the confused email or mobile phone together form the routing policy. When the information is synchronized to the global user center, the address information of the global user center, together with the unique code of the user and the segmented summarization information that has been confused by email or mobile phone, may be used to form a new routing policy and be sent to the network. The corresponding router in the network finds the global user center through the address information of the global user center. The global user center parses out the corresponding routing information and synchronizes the information to the local database of the global user center for storage.

Figure 7:
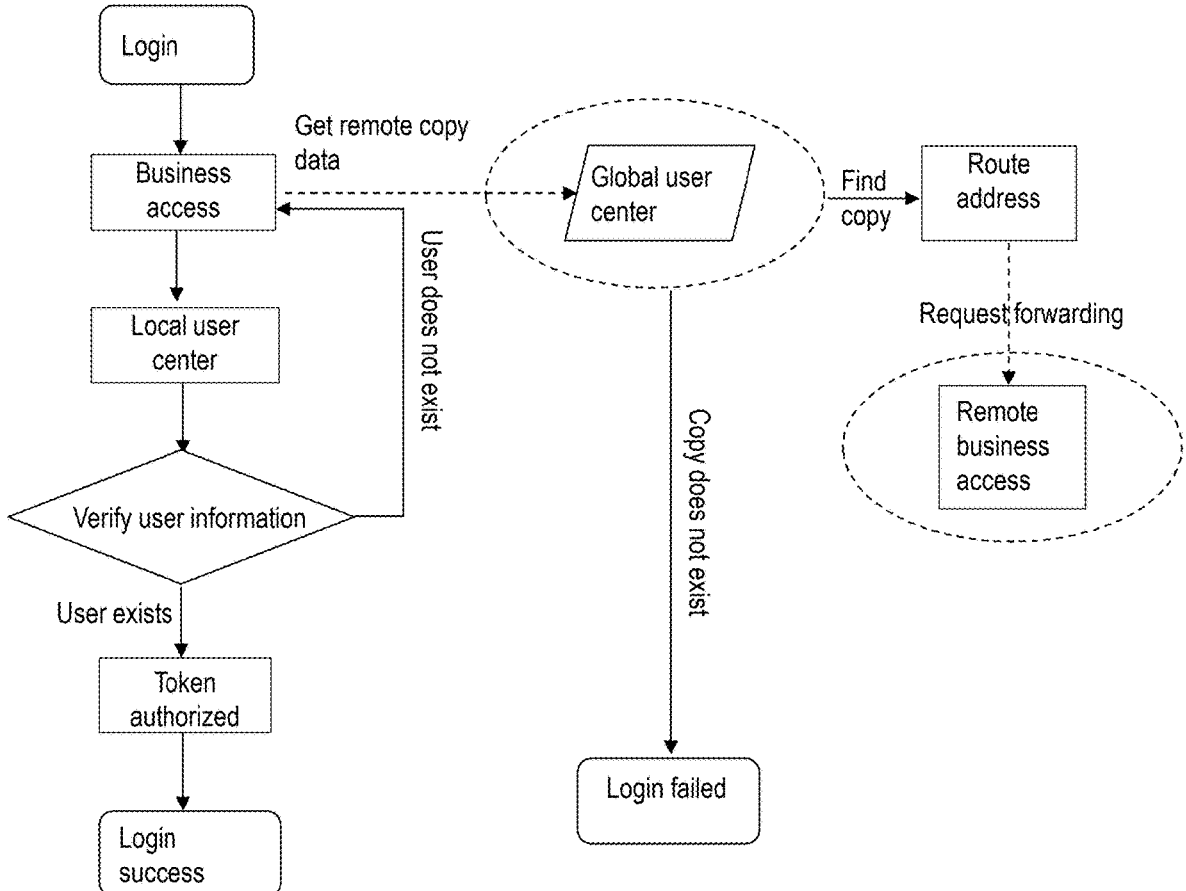
FIG. 7 is a flow chart of a login process for users.

Login process for users (refer to FIG. 7):

When the user logs in to a certain site and when the local user center may verify the user information, the token is authorized and the login is successful. When no relevant user information is found in the local user center, it is necessary to enable the routing-policy-based global user compliance login. The global routing key is used to confirm that different local user centers perform compliant information access and authentication, thereby shielding and eliminating discrepancy issues. The user code is composed of a fixed regional number, a request timestamp, a random string, and a single-zone atomic auto-increment key through the local center after confirming that registration is possible by correlating the information provided by the user during registration; the unique code of the user and the summarization information of the segments confusing the email or a mobile phone together form the routing policy. Through the policy, attention should not be paid to the registration methods and verification forms in different countries and regions. Specifically, the routing hierarchy in the example includes setting hierarchical information: the routing is divided into several hierarchies: login information, basic information, business information, status information and the regional number of the site;

relevant confusion calculations are performed on each of the hierarchies: a salt value is randomly generated, the salt value is confused with the corresponding routing hierarchical information according to certain rules, then the Hash result is obtained through the summarization algorithm MD5, and then the sensitive data involved in the corresponding routing hierarchy information is encrypted to form desensitized information corresponding to each hierarchy;

the desensitized information of each of the hierarchies are combined into a segment routing label to form a routing key-value pair;

routing key values of all hierarchies are formed into the routing key-value pairs corresponding to a certification request according to certain specifications. For example, the process for the first hierarchy:

| | |
|---|---|
| Composition | E-mail, mobile phone, user name |
| Algorithm | MD5+salt, AES |
| Example | Assume that the mobile phone number is 13456666666; the email address is test@xx.com; the username is ma12345 |
| Step 1 | a salt value is randomly generated for confusion calculation; 5REIVT2DGXBQEXQWJWKS0PKOT0VN2UJQ |
| Step 2 | confusion policy: login information CONCAT randomly generates the salt value, producing confusing results: mobile phone: 1345666666655REIVT2DGXBQEXQWJWKS0PKOT0VN2UJQ, e-mail: test@xx.com5REIVT2DGXBQEXQWJWKS0PKOT0VN2UJQ, user name: ma1234575REIVT2DGXBQEXQWJWKS0PKOT0VN2UJQ |
| Step 3 | the Hash result is obtained through the summarization algorithm MD5: mobile phone: 82167986943f390b6e3c011247b82609, e-mail: b14c02fc0ef2b672b65bc590e8135cfc, user name: f6f9ffb08b2574a1a864eebe4076b0f5; sensitive data such as mobile phone and e-mail are encrypted by AES : YVpzYU LetZrT6oVg4d6AyoKiZQrw== YVpzYU 0W3Wo406NOPKTUZhEX6HOGj2sVJkohqPnOq/j5bwaT4= |
| combined into segmented routing labels | hash routing: 82167986943f390b6e3c011247b82609 \| b14c02fc0ef2b672b65bc590e8135cfc \| f6f9ffb08b2574a1a864eebe4076b0f5 \| | the process for the second hierarchy:

| | |
|---|---|
| Composition | KYC status, subject identification |
| Algorithm | MD5+ salt |
| Example | Kyc hierarchy status L1, L2, L3 subject: Niuchi Intelligent Technology Co., Ltd. |
| Step 1 | a salt value is randomly generated for confusion calculation; 5REIVT2DGXBQEXQWJWKS0PKOT0VN2UJQ |
| Step 2 | confusion policy: basic information CONCAT randomly generates the salt value, producing confusing results : KYC: L25REIVT2DGXBQEXQWJWKS0PKOT0VN2UJQ, subject: Niuchi Intelligent Technology Co., Ltd. 5REIVT2DGXBQEXQWJWKS0PKOT0VN2UJQ |
| Step 3 | the Hash result is obtained through the summarization algorithm MD5: KYC status: 7e6aa2d53f6ee2b1a34b017fa403cb76 , subject: 8a8e80e0a8120057a1ea52923a346144 |
| combined into segmented routing labels | hash routing: 7e6aa2d53f6ee2b1a34b017fa403cb76 \| 8a8e80e0a8120057a1ea52923a346144 | the process for the third hierarchy:

| | |
|---|---|
| Composition | Business identification, activation status |
| Algorithm | MD5+ salt |
| Example | business identification: mpt ' fm ' b2b ' fx ; activation status: activated, not activated |
| Step 1 | a salt value is randomly generated for confusion calculation; 5REIVT2DGXBQEXQWJWKS0PKOT0VN2UJQ |

-continued

| | |
|---|---|
| Step 2 | confusion policy: business information CONCAT randomly generates the salt value, producing confusing results: business identification: mpt5REIVT2DGXBQEXQWJWKS0PKOT0VN2UJQ, |

-continued

| | |
|---|---|
| | activation status: activated, 5REIVT2DGXBQEXQWJWKS0PKOT0VN2UJQ |
| Step 3 | the Hash result is obtained through the summarization algorithm MD5: business identification: ac35308fff7abada50397bb69d5658e2, activation status: a06d405b6bb9a562f2674972968b8fa2 |
| combined into segmented routing labels | hash routing: ac35308fff7abada50397bb69d5658e2 \| a06d405b6bb9a562f2674972968b8fa2 |

The desensitized information processed by each hierarchy is combined in sequence to form a routing key-value pair corresponding to the certification request.

The global user center confirms the corresponding local user center through the corresponding routing key value, allowing it to perform compliant information access and authentication, thereby shielding and eliminating discrepancy issues. The entered user attribute information such as email address, mobile phone, and password together constitute the core information for determining the user. The summary of information mainly depends on user attribute information such as email address and mobile phone, and also supports other new types of custom logos. The summary information is mainly obfuscated by unified custom rules and then calculated through the summarization algorithm. The encryption algorithm is mainly AES; the routing key value is saved in the global user center. When the local user center where the user initiates the request finds no evidence, the global routing key value is used to confirm the target user center to be accessed. After confirmation, the routing key value is forwarded to the corresponding zone for verification. According to the email or mobile phone information entered for remote login, the original information is confused according to the routing policy, and the routing information may be matched through the summarization information; the routing information may confirm the location of the user. Verification is implemented in the local user center where the data is saved.

Based on the email or mobile phone information entered for remote login, the summarization information of routing information may be calculated according to the algorithm for generating routing policies. The routing information mainly includes: the unique code of the user, confused summarization information that requires verification (such as email, mobile phone or user name, depending on the login verification method in different regions), the region identification and business identification where the user data is located.

In summary, the invention may be implemented in hardware, or in software modules running on one or more processors, or in a combination thereof. Those skilled in the art should understand that general data processing devices such as microprocessors or digital signal processors (DSP) may be used in practice to implement some or all functions of some or all components according to embodiments of the invention. The invention can also be realized as a device or an apparatus program (for example, a computer program and a computer program product) for executing a part of or the entire method described herein. Such program realizing the present invention can be stored in a computer readable medium, or can adopt the form having one or more signals. Such signals can be downloaded from an Internet website, or provided on a carrier signal, or provided in any other form.

IT SHOULD BE UNDERSTOOD THAT THE EXEMPLARY EMBODIMENTS DESCRIBED HEREIN ARE ILLUSTRATIVE AND NOT RESTRICTIVE. ALTHOUGH ONE OR MORE EMBODIMENTS OF THE INVENTION HAVE BEEN DESCRIBED IN CONJUNCTION WITH THE ACCOMPANYING DRAWINGS, THOSE SKILLED IN THE ART SHOULD UNDERSTAND THAT VARIOUS CHANGES IN FORM AND DETAILS MAY BE MADE WITHOUT DEPARTING FROM THE SPIRIT AND SCOPE OF THE INVENTION AS DEFINED BY THE APPENDED CLAIMS.

What is claimed is:

1. A routing-policy-based global user compliance access method, comprising steps of:

S1: receiving, by a unified user gateway, a login request initiated by a user if there is a user login behavior, routing, by the unified user gateway, the login request to an authentication unit, and sending, by the authentication unit, an authenticated user request to a local user center for processing and to a global user center for global query if the user is a non-local user, which specifically comprise steps of:

initiating, by the local user center, a compliance access certification operation for the user if the local user center that receives an access request determines that the user of the access request is the non-local user;

dividing an information comprising a user code information, a basic information, a business information, and a status information into corresponding hierarchies according to a preset routing hierarchical rule and configuring for each part of the information, the user code information carrying a region code information of a remote user center where the user is registered;

performing relevant confusion calculations on each of the hierarchies respectively, and then encrypting a sensitive data involved in the corresponding routing hierarchical information to form a desensitized information corresponding to each of the hierarchies;

combining the desensitized information of each of the hierarchies into a segment routing label to form a routing key-value pair;

forming routing key values of all of the hierarchies into the routing key-value pair corresponding to a certification request;

S2: directly returning failure results if the global query fails, and otherwise returning a routing information to which the user belongs according to a global routing policy and redirecting the routing information to the remote user center to which the user belongs for request processing, which specifically comprise steps of:

parsing, by the global user center, the segment routing label from the routing key-value pair, and finding the routing hierarchical information containing the user code information through the segment routing label to obtain the region code information of the remote user center where the user is registered for obtaining a network address information of the remote user center;

S3: directly returning failure results if the global query fails, and otherwise returning the routing information to which the user belongs according to the global routing policy and redirecting the routing information to the remote user center to which the user belongs for request processing, which specifically comprise steps of:

receiving, by the remote user center, the routing key-value pair corresponding to the certification request, parsing the corresponding information according to the preset routing hierarchical rule, and completing the compliance access certification.

2. The method according to claim 1, wherein the performing relevant confusion calculations on each of the hierarchies respectively further comprises steps of: randomly generating a salt value for each of the hierarchies, confusing the salt value with the routing hierarchical information corresponding to each of the hierarchies according to a preset rule, and then obtaining a Hash result through a summarization algorithm MD5.

3. The method according to claim 1, wherein the completing, by the remote user center, the compliance access certification further comprises steps of:

receiving, by the remote user center, the routing key-value pair corresponding to the certification request and parsing the corresponding information according to the preset routing hierarchical rule, the corresponding information at least comprising the basic information, the business information and the status information, and giving a certification result after checking with a user information pre-stored in the remote user center.

4. The method according to claim 1, further comprising: the user code information is composed of a fixed regional number, a request timestamp, a random string, and a single-zone atomic auto-increment key of the remote user center in a registration place after confirming that registration is possible by correlating the information provided by the user during registration; an unique code of the user and a summarization information of segments confusing an email or a mobile phone together form a routing policy.

* * * * *